March 22, 1966     J. E. ANDERSON ETAL     3,242,309

HIGH-SPEED MULTI-ARC SEAM WELDING AND APPARATUS

Filed July 25, 1963                       2 Sheets-Sheet 1

INVENTOR.
JOHN E. ANDERSON
DONALD M. YENNI

BY *Barnwell Q. King*

ATTORNEY

March 22, 1966 J. E. ANDERSON ETAL 3,242,309
HIGH-SPEED MULTI-ARC SEAM WELDING AND APPARATUS
Filed July 25, 1963 2 Sheets-Sheet 2
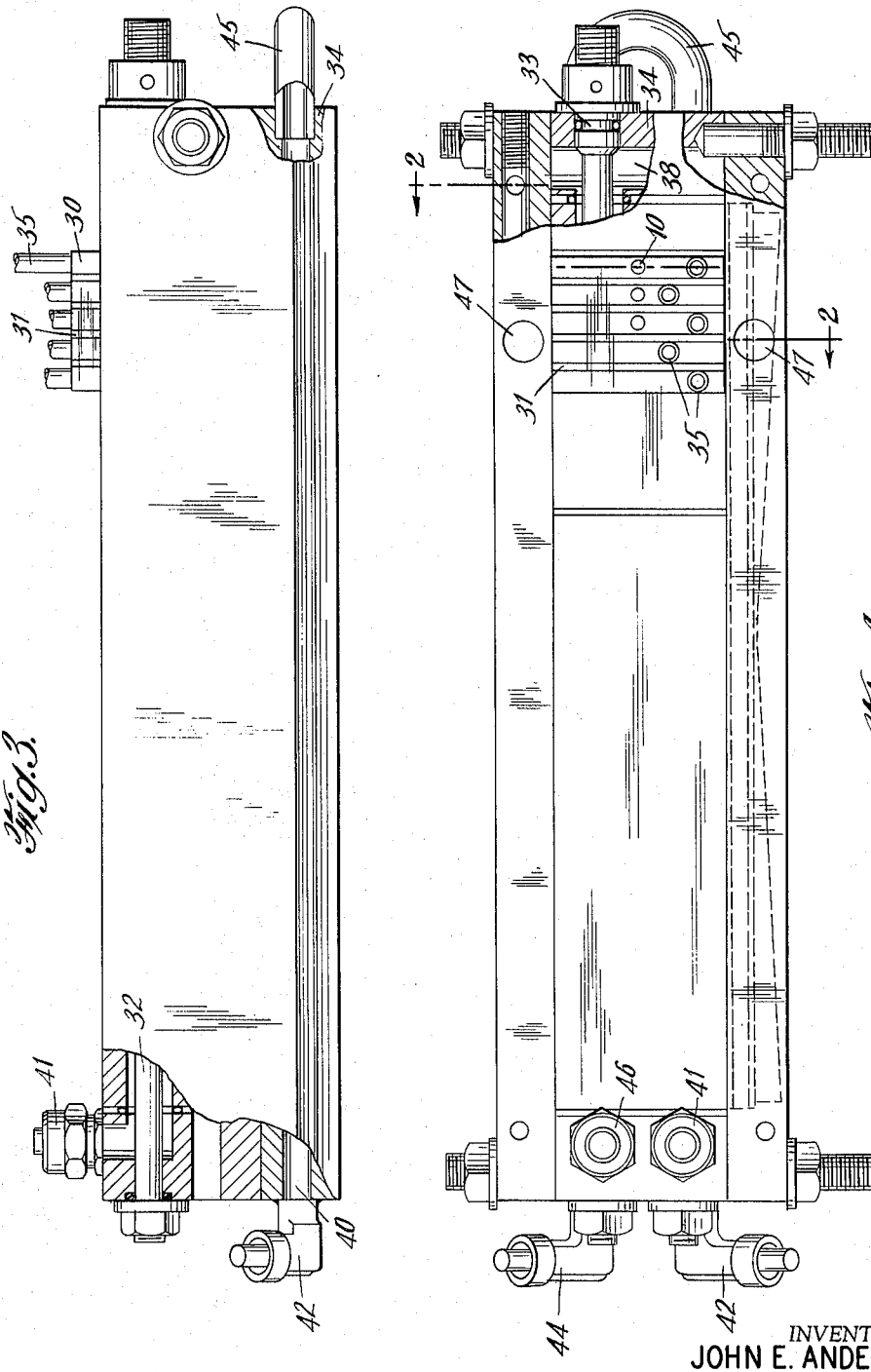
INVENTOR.
JOHN E. ANDERSON
DONALD M. YENNI
BY Barnwell P. King
ATTORNEY

United States Patent Office 3,242,309
Patented Mar. 22, 1966

3,242,309
HIGH-SPEED MULTI-ARC SEAM WELDING AND APPARATUS
John E. Anderson and Donald M. Yenni, Indianapolis, Ind., assignors to Union Carbide Corporation, a corporation of New York
Filed July 25, 1963, Ser. No. 297,641
9 Claims. (Cl. 219—124)

This invention relates to multi-arc systems, and more particularly to high-speed seam welding.

The invention provides for very substantially increasing the speed of arc welding seams which involves the use of a plurality of relatively short (i.e., ⅛ inch maximum length) arcs which are spaced as closely as possible without undesirable arc blow between adjacent arcs.

One of the primary goals in the field of arc welding seams is that of increasing the welding speed. One approach to increasing welding speed is to increase the heat transfer rate to the weld plate. This is easily accomplished by increasing the arc current. However, above a current of about 200–300 amperes in normal operation, there is relatively little increase in the anode weld plate heat transfer intensity around the arc axis as the current is increased. Instead the heat is transferred over a wider area. For such reason, plus detrimental effects due to increased arc "pumping" at higher currents, increased welding speeds at currents above those normally recommended for tungsten-inert-gas or "tig" welding, lead to undercut welds that are unacceptable. Such undercut causes a reduced section in the member being welded. This results from the weld puddle not filling a cavity in the member, formed in part by arc pumping when the member is heated.

It is therefore, an object of the present invention to provide a novel method of and means for substantially increasing the welding speeds of multi-arc seam welding without objectionable undercutting.

Such object is, in general, accomplished by utilizing a plurality of arcs that are relatively short, i.e., having an arc length of less than ⅛ of an inch.

As an example of the invention, metal parts to be welded are arranged in abutting relation to provide a welding seam. A row of electrodes are held above such seam in substantially equally spaced parallel relation to one another with the lower ends of such electrodes substantially equally spaced from the work to provide separate arc gaps, each of which has a maximum arc length of the order of ⅛ inch. The electrodes are electrically insulated from one another. Suitable gas is discharged downwardly over the lower ends of such electrodes and onto such work in the area of such seam in a continuous and preferably common stream. Separate welding arcs are energized in such gaps between the lower ends of the electrodes and the work with current. Then, all of such electrodes are moved as a unit in a direction parallel to such seam at a welding speed, the maximum value of which is substantially equal to the number of electrodes multiplied by the normal welding speed of one of such arcs to fully weld the metal parts along such seam without undesirable undercutting. In the case of seam welding tube or tubing, the latter is moved under such arcs at such speed.

An example of a torch of the invention comprises a plurality of relatively flat blocks of electrically conductive metal each of which is provided with a vertical hole in substantially the center thereof. The blocks are arranged in parallel relationship with one another, and are electrically insulated from one another. The blocks are held in such parallel relationship by means (of side plates) having gas passageways including a gas outlet in the shape of a longitudinal slot located below such blocks for discharging a common stream of arc-shielding inert gas downwardly. Electrodes are mounted in the holes, having arc-end portions extending below the blocks and substantially centrally into such gas outlet slot.

The invention can more readily be understood with reference to the accompanying drawings in which:

FIG. 3 is a fragmentary view mainly in side elevation of the torch; and

FIG. 4 is a fragmentary top view of the torch.

Figure 1:
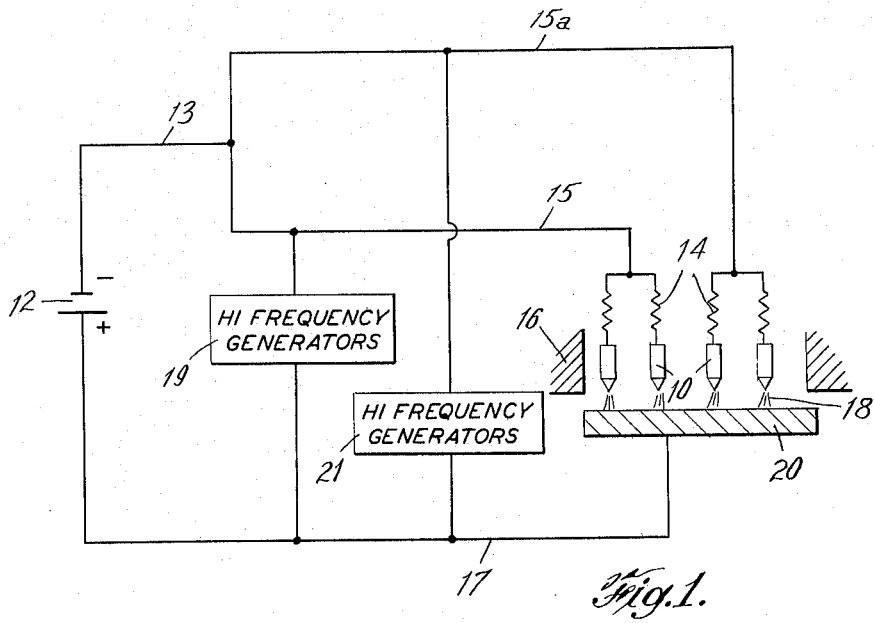
FIG. 1 is a schematic diagram of a preferred electrical circuit suitable for carrying out the invention.

Referring to FIG. 1, each one of a plurality of non-consumable electrodes 10 is connected to a suitable common power source 12 through an individual resistor 14. Gas cup or nozzle 16 surrounds the electrodes so that a selected shielding gas, such as argon, helium, or a mixture thereof, may be passed down around the electrodes. The nozzle is preferably water cooled. A short arc 18 is maintained between each electrode and a common electrode 20 (weld metal) by connecting power source 12 with the weld metal and the electrodes 10 through leads 13, 15, 15a and 17.

As indicated, a preferred operating power is direct current with the weld metal acting as the anode. Thus, the invention is primarily directed to a multi-cathode operation. It should be understood, however, that direct current with reverse polarity, and alternating current or combinations thereof could be used. For metals other than aluminum and magnesium, D.C-S.P. is preferred; while for aluminum and magnesium A.C.-H.F., or D.C.-R.P. is preferred. However, suitable different power combinations can be used according to the invention.

Suitable materials for non-consumable electrodes are those having good electrical emissivity, such as tungsten or tungsten containing thoria; and for the nozzle, good thermally conductive materials, such as copper can be used. As another alternative, each electrode 10 may consist of a water cooled anode for reverse polarity. For systems including consumable electrodes the choice of electrode material is normally similar to the material being welded.

The electrical resistance 14 in series with each electrode serves to stabilize the operation of the arcs and prevent any one electrode from becoming overloaded with current. As the current increases in one of the arcs, the voltage drop across the resistor increases causing the arc voltage to decrease. The decrease in arc voltage tends to resist the increase in arc current. In the same way, a decrease in arc current is resisted by an increase in arc voltage. It should be understood, however, that other means to stabilize the arc could be used. Separate generators, for example, could be used.

In practice, the value of the resistances should be kept to a minimum in order to keep the power consumption low. For 3 or more electrodes, each operating at a current of from about 100 to about 200 amperes, a resistance of about 0.16 ohm was found to be adequate. Also, in practice, various elements or materials may be used for the resistance, i.e., water cooled, stainless steel tubing, for example.

Various means may be used for initiating the arcs. For example, a carbon rod can be used. However, a high frequency discharge is preferred as a matter of convenience. Also as a matter of convenience, it is preferred that all of the arcs be initiated simultaneously, rather than individually. Under such condition it has been found, when using a welding high-frequency generator of the type known to the welding industry as Miller H.F. 20 that, in order to initiate an arc from all of the electrodes simultaneously, no more than three electrodes should be used with one high frequency generator at an open circuit voltage at least 40 volts. When more than one high frequency generator is used, they are electrically isolated from one another, except for a common anode. Thus, as shown in FIG. 1 two high frequency generators 19 and 21 are connected to two sets of electrodes through lines 15 and 15a with a common lead 17 to the anode-workpiece 20.

Generally speaking, welding speed increases without undercutting as the number of electrodes increases. However, because of the very rapid cooling rate in the weld metal, it has been found that the increase in welding speed becomes only nominal when the spacing of the electrodes exceeds 1 inch from center to center. The minimum spacing is controlled primarily by the magnetic interaction between the arcs.

Magnetic interaction between arcs depends upon the number of arcs, arc current, arc length, and electrode spacing. This is, at normal welding currents of up to 300 amperes, the number of arcs, the length and the electrode spacing are critical. When two arcs are used, the arcs are attracted towards one another and for closely spaced electrodes, the arcs act like a single arc originating from an imaginary cathode between the real cathodes.

When more than two arcs were used, the leading arc would excessively bend backward and the trailing arc would excessively bend forward for too long an arc length or too close an electrode spacing. Thus, magnetic interaction was strong at a $3/32$ of an inch arc length and $1/4$ inch electrode spacing. The interaction was also strong when only two arcs were used at a $1/16$ inch arc length and at a $1/4$ inch and $1/2$ inch electrode spacing. Under such conditions, it is difficult to obtain uniform welds and the welding speed is reduced.

However, magnetic interaction is not a problem in the case of three or more electrodes each carrying 100 amperes or more, providing the spacing is $1/4$ inch or more for short arc length of $1/32$ to $1/16$ of an inch, and $1/2$ inch or more for an arc length of $1/8$ inch.

For current levels of from 10–100 amperes/electrode and arc length below $1/32$ of an inch, the spacing between the arcs should be between $1/8$–$3/8$ of an inch.

Thus, in general, the arc length should be less than $1/8$ and the electrode spacing no greater than 1 inch, center to center; while for optimum welding conditions, there should be at least 3 electrodes with a spacing of between about $1/4$ inch and 1 inch, center to center, and an arc length of between $1/32$ and $1/8$ of an inch.

It should be noted that arc length is determined by measuring the distance between the electrode tip and the workpiece when there is no arc running.

In the practice of the invention it has been found to be necessary to have good electrode alignment and adequate shielding gas protection, at least across the full length of the molten zone, in order to achieve good welds. These requirements are adequately met by the apparatus of FIGS. 2 through 4.

Figure 2:
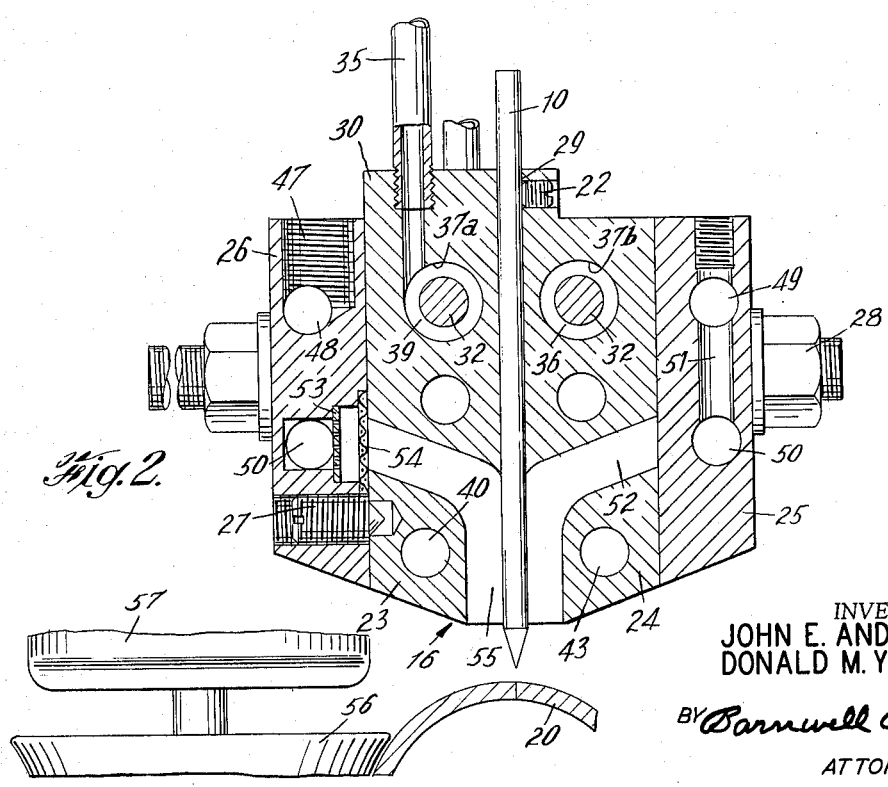
FIG. 2 is an enlarged section of the torch taken along line 2—2 of FIG. 4, a portion of the work being welded being shown under the torch.

Referring to FIGS. 2–4, a plurality of stick electrodes 10 are held in exact alignment in spaced parallel bores 29 in torch body T, and set screws 22. Gas cup or nozzle 16 is formed from two members 23 and 24 which are held in position by side plates 25 and 26 provided with a plurality (4) of set screws 27. Side plates 25 and 26 are tied to the torch body T by a plurality (4) of bolts 28.

Torch body T comprises a plurality of copper electrode holders 30 in the form of relatively flat blocks or plates each containing one of the aforementioned bores 29. The copper holders 30 are separated from each other by electrical insulators 31 in the form of thick sheets. The torch body assembly is held together longitudinally by a pair of tie bolts 32, having their ends enlarged so as to mate O-rings in apertures 33 in end plate 34.

Power is supplied to the electrode holders 30 through tubing 35. Tubing 35 also serves as the inlet for the torch body water cooling. The cooling water enters the torch body through the tubing where it passes along one side of the body through annulus 39 formed by the tie bolt 32 and bore 37a. It then passes to the other side of the body through conduit 38 where it passes through annulus 36 formed by bolt 32 and bore 37b. From there it passes to conduit 43 through a hose (not shown) connected to fittings 46 and 44. From conduit 43, the water then passes through conduit 40 by way of conduit 45 so that the gas cup or nozzle 16 is effectively water cooled. It then exits through fitting 42. Fitting 41 serves as an auxiliary in case it is desired to reverse or otherwise change the water flow.

Adequate gas shielding is maintained over the entire cross section of the gas cup outlet. Such shielding insures that the molten metal being welded is protected from the atmosphere. The shielding gas enters the torch through a plurality (2) of inlets 47 in side plates 25 and 26, where it passes through upper longitudinal conduits 48 and 49 therein. It then passes to lower longitudinal conduits 50 by way of two vertical conduits 51. From there the gas passes to a common outlet slot 55 by way of arched passages 52. An even flow distribtuion is insured by a perforated plate 53 and screen 54 located adjacent to the inlet of each arched passage 52. Further, to insure that the flow will be evenly distributed along the entire length of the torch, each conduit 50 is tapered toward the center of the torch.

The work 20, such as tubing, is moved longitudinally under the torch T by suitable rolls 56, some of which are driven by motor 57 during the welding operation. If desired, however, the torch may be moved over and in the direction of the seam being welded, on a track by a motor (not shown).

The operation of the invention is shown by the following example employing apparatus as described with reference to FIGS. 2–4.

Bead-on-plate

In this example, four $1/8$ inch cathodes, spaced $1/4$ inch apart were used to make a bead-on-plate weld on a 16 ga. stainless steel sheet or plate 3 inches wide by 18 inches long. The ends of the electrodes were tapered to a .020 inch blunted tip. The tip was $1/32$ of an inch from the work. Two high frequency generators were used to start the arcs, the open circuit voltage being 39 volts. Each electrode was connected in series to a resistor consisting of a coiled, water-cooled, stainless steel tube having a resistance of 0.16 ohm.

The total current to the electrodes was 630 amperes there being 162 amperes supplied to one electrode and 156 amperes to each of the others. The four arc voltages were 10, 8, 9, and 9 volts, respectively. Argon gas at the rate of 150 c.f.h. was fed down around the electrodes. With a welding speed of 120 inches per minute a good bead with full penetration and no under-cutting was achieved. This was 4 times faster than the welding speed when using a single electrode for making a weld on the same type and size of metal.

The following examples illustrate the use of sigma welding, A.C. current operation, and the use of the rod filler in conjunction with non-consumable electrodes.

Butt welding with A.C.

Two, $1/8$ inch, 2% thoriated tungsten electrodes, spaced $1/4$ inch apart, were used to make a butt weld between two, $1/8$ inch thick aluminum plates. The same circuit shown in FIG. 1 was used excepting there was only one HF generator and the D.C. current source was replaced with an A.C. current source (about 75 v. OCV). The arc length was $1/32$ of an inch. At a welding speed of 30 i.p.m.

and a current of 270 amperes, a good weld with no undercut was made.

Sigma welding (short arc)

A bead on plate test was made using 3 Oxweld 65 consumable wires as the electrodes. The test was made on a mild steel plate. The arcs were spaced ½ inch apart and had an arc gap of about 1/32 of an inch. The wire feed rate was about 240–300 i.p.m. With a total current of about 240 amperes at 27 v., the metal was deposited with an excellent bond and low dilution.

Non-consumable with rod feed

A butt weld was made on ⅛ inch stainless steel plates using 6, non-consumable, 2% thoriated tungsten electrodes, and 2, .030 inch Oxweld 310 wires. The wires were between the 3rd and 4th electrodes and between the 4th and 5th. The electrode spacing was ¼ inch. The arc gap for the non-consumable electrodes was 1/16 of an inch. $I^2R$ heating was used to melt the wires. The total current was 1100 amperes. At a weld speed of 80 i.p.m. and a wire feed rate of 337 i.p.m. a good butt weld was made.

What is claimed is:

1: High-speed multi-arc seam welding system in which there is relative movement between the arcs and the work being welded, comprising means for energizing a plurality of relatively short welding arcs between the ends of corresponding electrodes and such work, along the seam to be welded, which arcs are spaced as closely as possible without undesirable arc blow between adjacent arcs; means completely shielding all of such arcs with gas to protect the operation from the atmosphere; and means for relatively moving all of such electrodes as a unit in a direction parallel to such seam at a welding speed the maximum value of which is substantially equal to the number of electrodes multiplied by the normal welding speed of one of such arcs to fully weld the work along such seam without undesirable undercutting.

2. Welding system as defined by claim 1, in which such complete shielding is obtained by means providing a common gas stream.

3. High-speed multi-arc seam welding system in which there is relative movement between the arcs and the work being welded, comprising means for energizing a plurality of short arcs between the ends of corresponding non-consumable electrodes and such work, along the seam to be welded, which arcs are spaced as closely as possible; means for completely shielding all of such arcs with inert gas to protect the operation from the atmosphere; and means for relatively moving the work in a direction parallel to such seam at a welding speed the maximum value of which is substantially equal to the number of electrodes multiplied by the normal welding speed of one of such arcs to fully weld the work along such seam without undesirable undercutting.

4. Gas-shielded, electrode, work-in-circuit, multiple arc seam welding system which comprises means supporting metal parts to be welded in abutting relation to provide a welding seam, means for holding above such seam a row of electrodes in substantially equally spaced parallel relation to one another at a spacing therebetween of no more than 1 inch with the lower ends of such electrodes substantially equally spaced from the work to provide separate arc gaps each of which has a maximum arc gap length of the order of ⅛ inch, such electrodes being electrically insulated from one another; means for flowing gas downwardly over the lower ends of such electrodes and onto such work in the area of such seam in a common and continuous gas stream; means for energizing separate welding arcs in such gaps between the lower ends of the electrodes and the work, and means for relatively moving all of such eelctrodes as a unit in a direction parallel to such seam at a welding speed the maximum value of which is substantially equal to the number of electrodes multiplied by the normal welding speed of one of such arcs to fusion weld the work along such seam without undesirable undercutting.

5. Welding system as defined by claim 4, in which the work is stainless steel, the gas is selected from the class consisting of argon, helium and mixtures thereof, and the electrodes are composed of tungsten.

6. A multi-arc torch, comprising a plurality of relatively flat blocks of electrically conductive metal each of which is provided with a vertical hole in substantially the center thereof, said blocks being arranged in parallel relationship with one another, means holding the blocks in such parallel relationship, said means having gas passageways including a gas outlet in the shape of a longitudinal slot located below such blocks for discharging a common stream of arc-shielding inert gas downwardly, and an electrode in each of said holes, such electrodes having arc-end portions extending below the blocks and substantially centrally into such gas outlet slot.

7. In combination with a torch as defined by claim 6, means for supplying gas to said torch, and electric circuit means for energizing an arc between each of said electrodes and work in circuit therewith.

8. In a gas shielded arc welding system combination with a gas-shielded, multi-arc torch as defined by claim 6, of means for simultaneously energizing arcs between the ends of such electrodes and work in circuit therewith, comprising a ground circuit for connecting such work to one side of a suitable power source, and an electrode circuit for connecting each of said electrodes to the other side of said power source, comprising a separate resistor connected in series circuit relation with each electrode, serving to stabilize the operation of the arcs.

9. In a gas shelded arc welding system, combination as defined by claim 8, in which a separate high-frequency generator is associated with the circuit of each pair of electrodes for starting all of the arcs at the same time.

References Cited by the Examiner

UNITED STATES PATENTS

| | | | |
|---|---|---|---|
| 2,868,956 | 1/1959 | Lobosco | 219—137 |
| 2,938,107 | 5/1960 | Pease | 219—131 |
| 2,951,934 | 9/1960 | Engel | 219—130 |
| 3,007,033 | 10/1961 | Newman et al. | 219—137 |
| 3,050,616 | 8/1962 | Gage | 219—69 |
| 3,172,992 | 3/1965 | Keller | 219—130 |
| 3,177,338 | 4/1965 | Hoffmann | 219—131 |

RICHARD M. WOOD, Primary Examiner.

JOSEPH V. TRUHE, Examiner.